(12) United States Patent
Gorbulsky

(10) Patent No.: US 6,939,398 B2
(45) Date of Patent: Sep. 6, 2005

(54) DRUM SCRUBBER

(76) Inventor: Jacob Gorbulsky, 217 Lockart Ter., Philadelphia, PA (US) 19116-3137

( * ) Notice: Subject to any disclaimer, the term of this patent is extended or adjusted under 35 U.S.C. 154(b) by 21 days.

(21) Appl. No.: 10/665,342

(22) Filed: Sep. 18, 2003

(65) Prior Publication Data

US 2004/0079234 A1 Apr. 29, 2004

Related U.S. Application Data

(60) Provisional application No. 60/412,121, filed on Sep. 19, 2002.

(51) Int. Cl.⁷ .............................................. B01D 47/00
(52) U.S. Cl. .............................. 96/234; 96/274; 96/277; 96/289
(58) Field of Search .......................... 96/234, 243, 274, 96/276, 277, 291, 296, 297, 281, 286, 287, 289; 210/384

(56) References Cited

U.S. PATENT DOCUMENTS

| | | | | |
|---|---|---|---|---|
| 282,994 A | * | 8/1883 | Laycock et al. ............... | 261/92 |
| 1,762,560 A | * | 6/1930 | Morton ........................ | 210/784 |
| 1,786,208 A | * | 12/1930 | Anders ........................ | 96/289 |
| 3,306,591 A | * | 2/1967 | Valazza ....................... | 261/23.1 |
| 3,385,573 A | * | 5/1968 | Gilman ........................ | 261/24 |
| 3,705,479 A | * | 12/1972 | McPherson ................... | 96/259 |
| 3,837,148 A | * | 9/1974 | Mattson ....................... | 96/231 |
| 4,135,894 A | * | 1/1979 | Himes et al. .................. | 95/215 |
| 4,946,602 A | * | 8/1990 | Ekberg et al. ................ | 210/785 |
| 5,180,406 A | * | 1/1993 | Shih ............................ | 96/262 |
| 5,681,371 A | * | 10/1997 | Carr ............................ | 95/204 |
| 5,851,271 A | * | 12/1998 | Baptista et al. ................ | 96/286 |

* cited by examiner

*Primary Examiner*—Frank M. Lawrence

(57) ABSTRACT

The invention creates a new type of scrubbers: drum scrubber. In the drum scrubber, processed gas passes through a wet fiber filter, but unlike previously invented fiber-bed scrubber, the fiber is constantly cleaned. The cleaning is achieved by using filter material as a surface of the rotating drum, partially immerged in a liquid. While periodic immersion of filter fiber in liquid might achieve appropriate particle removal for some applications, better cleaning is provided by creating a reverse flow of liquid through the filter material. In addition, filter material could be sprayed with liquid from either within the drum or from outside of the drum, or both. Also, ultrasound could be used to release particles trapped within fibers while fibers are immerged in the liquid. This solves the plugging problem normally associated with wet filter and allows its use in most applications, including applications with a high dust load.

9 Claims, 6 Drawing Sheets

SECTION A-A

VIEW B

SECTION A-A

SECTION A-A

SECTION A-A

SECTION A-A

SECTION A-A

DRUM SCRUBBER

CROSS-REFERENCE TO RELATED APPLICATIONS

Continuation of prior Provisional Patent Application No. 60/412,121, filed Sep. 19, 2002.

BACKGROUND-FIELD OF INVENTION

This invention relates to dust-collection equipment in industrial gases, particularly to scrubbers. The invention creates a new type of scrubber: drum scrubber.

STATEMENT REGARDING FEDERALLY SPONSORED RESEARCH AND DEVELOPMENT

The invention was not made under a federally sponsored research and development.

BACKGROUND-DESCRIPTION OF PRIOR ART

Removal of particulate and gaseous pollutants from exhaust gases is required for many industries and fossil power plants. Scrubbing is often used because of its ability to remove both particulate and gaseous pollutants.

The type of unit for a specific application is determined by a number of factors, including dust loading, type and size of particles, gas temperature, presence of gaseous pollutants, and allowable concentration of pollutants in outlet gases. A common method of scrubbing is to spray a scrubbing medium, such as water, across the exhaust gas passage, or to force the exhaust gases through a continuously fed curtain of water, or along a channel with wetted sides. These technologies for scrubbing fine particles from gaseous streams have relied upon mechanical shear systems to produce large quantities of fine droplets of scrubbing solution. In each instance droplet surface area is the controlling parameter determining the efficiency of the scrubber. To increase scrubber droplet surface area for a given water mass, the average droplet diameter must decrease. The energy required to decrease the average droplet size and thus increase the average droplet surface area increases sharply. Thus the efficiency of conventional scrubbers for fine particle removal is a function of the energy input as measured by the pressure loss across the scrubber. Typical high efficiency scrubbers (>99% efficiency) operate with pressure drops in the range of 45–60 inches of water. Such units have high capital costs and high energy and maintenance costs.

According to *Perry's Chemical Engineering Handbook*, ISBN 0-07-049479-7, Sixth Edition, Page 20–96, Lucas and Porter (U.S. Pat. No. 3,370,401, 1967) developed a fiber-bed scrubber in which the gas and scrubbing fluid flow vertically upward through a fiber bed. The beds tested were composed of knitted structures made from fibers with diameters ranging from 0.089 to 0.406 mm. Lucas and Porter reported that the fiber-bed scrubbers gave substantially higher efficiencies than did venturi-type scrubbers tested with the same dust at the same gas pressure drop.

Despite their potential for increased collection efficiency, fiber-bed scrubbers have only limited commercial acceptance for dust collection because of their tendency to become plugged. Their principal use has been in small units, such as engine-intake-air cleaners, for which it is feasible to remove the fiber bed for cleaning at frequent intervals.

SUMMARY

The invention creates a new type of scrubbers: drum scrubber. In the drum scrubber, processed gas passes through a wet fiber filter, but unlike previously invented fiber-bed scrubber, the fiber is constantly cleaned. The cleaning is achieved by using filter material as a surface of the rotating drum, partially immerged in a liquid.

While periodic immersion of filter fiber in liquid might achieve appropriate particle removal for some applications, better cleaning is provided by creating a reverse flow of liquid through the filter material. In addition, filter material could be sprayed with liquid from either within the drum or from outside of the drum, or both. Also, ultrasound could be used to release particles trapped within fibers while fibers are immerged in the liquid.

This solves the plugging problem normally associated with wet filter and allows its use in most applications, including applications with a high dust load.

DRAWING FIGURES

DETAILED DESCRIPTION OF THE INVENTION

Figures 1A, 1B:
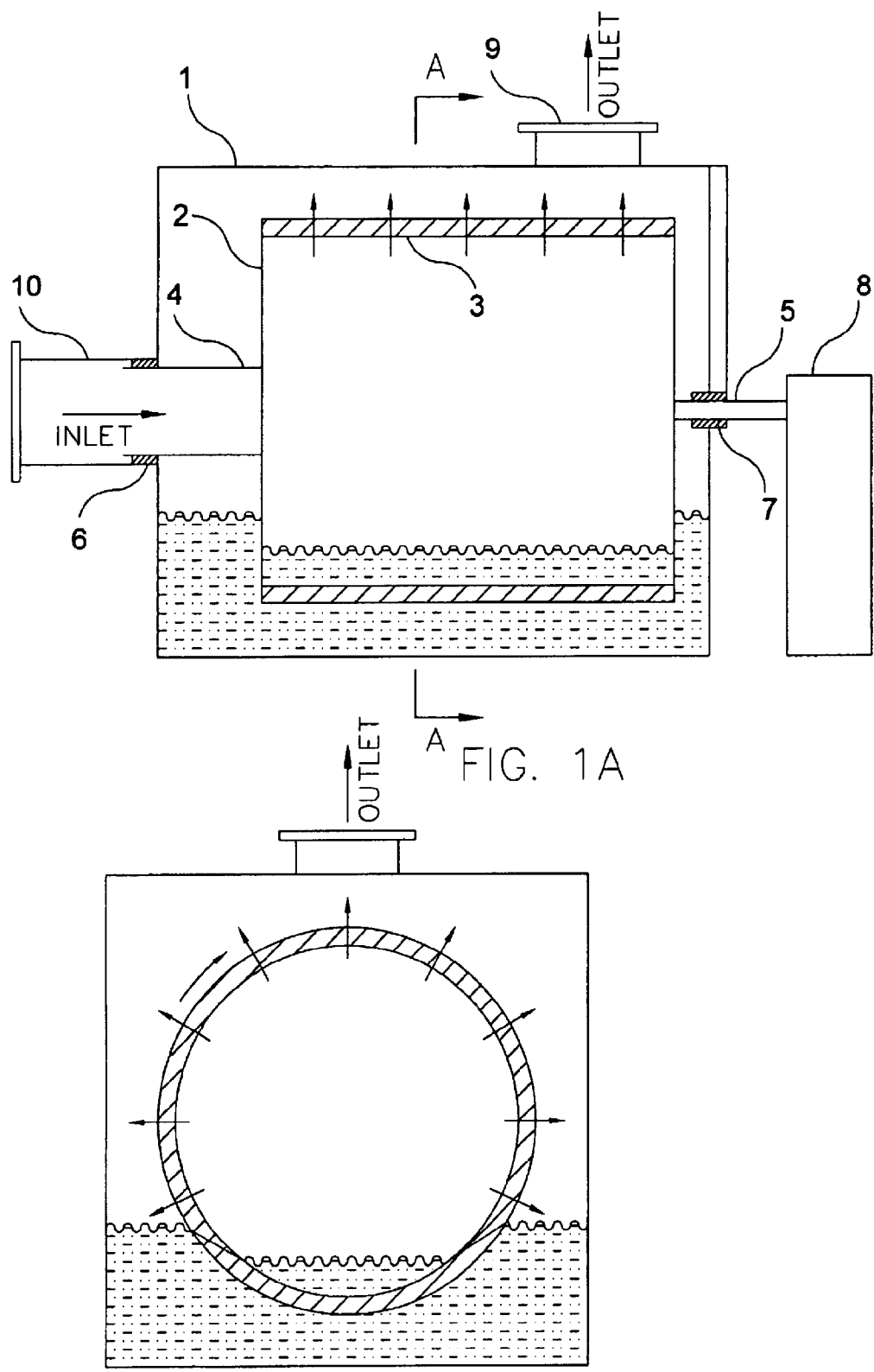
FIGS. 1A and 1B is a typical arrangement of drum scrubber.

The description that follows, and the embodiments described therein, are provided by way of illustration of an example of a particular embodiment, or examples of particular embodiments, of the principles of the present invention. These examples are provided for the purposes of explanation, and not of limitation, of those principles and of the invention. In the description, like parts are marked throughout the specification and the drawings use the same respective reference numerals. The drawings are not necessarily to scale and in some instances proportions may have been exaggerated in order to more clearly to depict certain features of the invention.

FIGS. 1A and 1B shows a typical arrangement for drum scrubber. The scrubber consists of a filter tank 1, which is usually a rectangular steel box, partially filled with liquid, usually water, and rotating drum 2. The cylindrical surface of the rotating drum is made of filtering material 3, such as fibers or cloth. The filtering material is supported by structural elements of drum 2. For example, drum structure can consist of two round steel plates connected at their perimeter by structural angles or bars. Cloth filter could be attached to these structural angles or bars. Fiber material has to be sandwiched between two mesh screens to be attached to these structural angles or bars. It is possible also to sew together a layer of fiber material to create a cloth-like material, which will not require mesh screens to hold it in place.

The rotating drum 2 has connecting duct 4 on one side and a rod or a tube 5 on the other side. Sliding supports 6 and 7 are supporting drum 2 on both sides, allowing its rotation. A variable speed motor with transmission 8 rotates drum at appropriate speed. An optimal speed varies with applications and should be determined by testing. Optimal speed for a drum having 1.8 m (6 feet) in diameter should be between 1 and 20 revolutions per minute.

Treated gas enters rotating drum 2 through inlet duct 10 and connecting duct 4, flows through filtering material 3 into filter tank 1, and leaves through outlet 9. Because rotating drum 2 is partially immersed in cleaning liquid, filtering media is consistently wet. Wet media has higher filtration efficiency, than dry media.

The filter media is cleaned each time it is immersed in the cleaning liquid. Filter media cleaning is vital for prolonging filter life, especially for gases with high dust loads. Difference in levels of the cleaning liquid inside and outside rotating drum 2 is equal to pressure drop of gases through a filtering media.

Instead of simply soaking filtering media in cleaning liquid, we can create a flow of cleaning liquid through filtering media by pumping cleaning liquid to or from rotating drum 2. If liquid flows through the filter media in the same direction as gas, we will call it direct flow. If liquid flows in opposite direction, we will call it reverse flow, or backwash. Reverse flow of cleaning liquid is highly desirable.

Figure 2A:
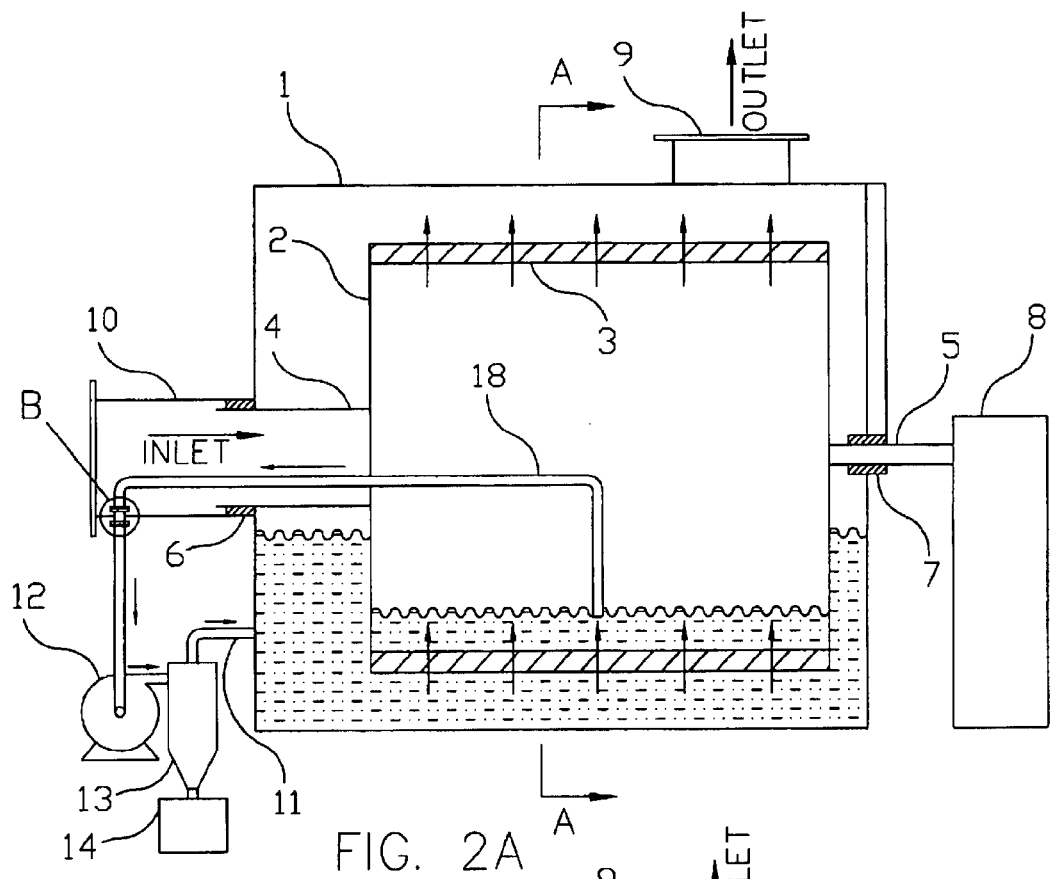
FIG. 2A–2C is a typical arrangement of drum scrubber with backwash.
Figure 2B:
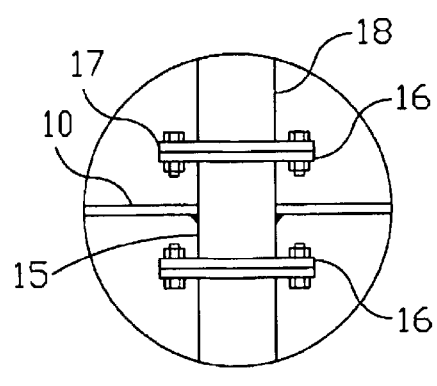
Figure 2C:
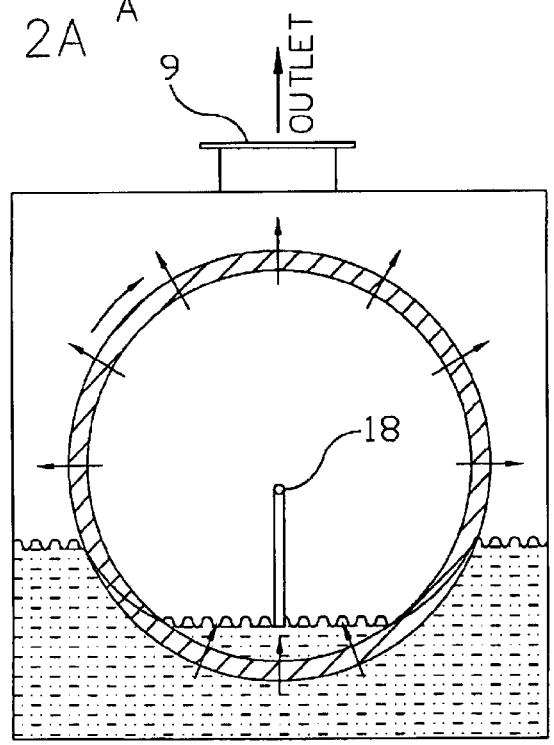

FIG. 2A–2C shows a typical arrangement for drum scrubber with backwash. Except for an addition of liquid circulation system, the scrubber is similar to shown on FIG. 1A and described above. The liquid circulation system consists of connecting piping 11 and 18, pump 12, cyclone 13, and collector 14. The cyclone 13 and collector 14 are optional and should be used primary for gases with high load of solids. In absence of cyclone 13 and collector 14, solids will accumulate in the filter tank 1 and can be removed periodically. Solids, accumulated in collector, must also be removed periodically, but the removal is easier, can be done without stopping the scrubber, or removed together with collector (for example, if collector itself is a disposable drum).

Pump 12 pumps liquid from the rotating drum 2 through piping 18, cyclone 13 (if cyclone is present), piping 11, and into filter tank 1. It results in liquid level in the rotating drum 2 to be much lower than in surrounding tank 1. If difference in levels of liquid inside and outside rotating drum 2 multiplied by liquid density is higher than gas pressure drop on filtering material, liquid will flow through filtering material in a direction, opposite to direction of gas flow. Reverse flow of liquid should effectively remove solid particles from the filtering material.

In order to pump cleaning liquid from rotating drum 2, a pipe 18 shall be inserted inside of the rotating drum. One of possible designs is shown on FIG. 2A. A piece of pipe 15 is welded to duct 10 as shown on FIG. 2A. Flanges 16 are welded to pipe 15 on both sides. After duct 10 is attached to the filter tank 1 and rotating drum 2 is installed, pipe 18 with a flange 17 on its end is inserted through duct 10 and attached by flange 17 to pipe 15. Duct 10 and connecting duct 4 are normally much shorter than shown on FIG. 2A. In addition, pipe 18 should be bent in such way as to allow insertion. The other end of pipe 15 is connected to the inlet of pump 12. Pump 12 pumps cleaning liquid from the rotating drum 2, through liquid cyclone 13 or other particle removal device, if any, and into filter tank 1.

Figure 3A:
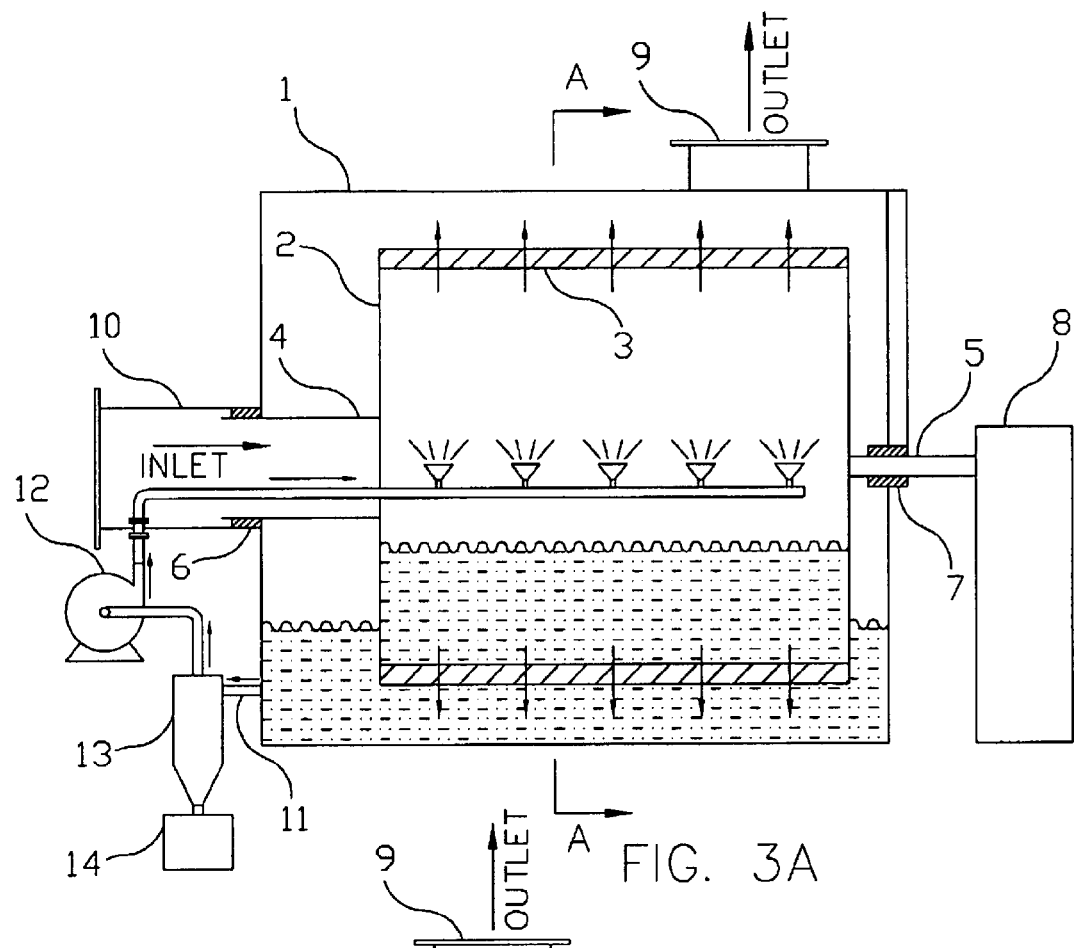
FIGS. 3A and 3B is a typical arrangement of drum scrubber with direct flow.
Figure 3B:
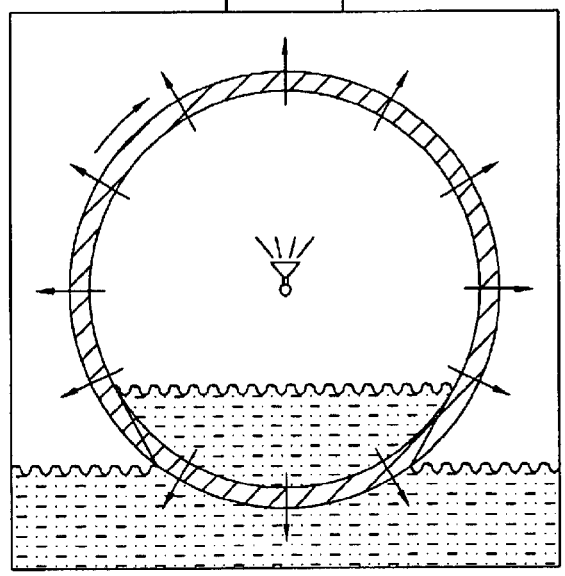

FIGS. 3A and 3B shows a typical arrangement for drum scrubber with direct flow. Except for opposite liquid flow direction, the scrubber is similar to shown on FIG. 2A and described above. The cleaning liquid flows through filter material in the same direction as gas.

The benefit of such an arrangement is in higher pressure drop of liquid moving through the filter material. Unlike in an arrangement shown on FIG. 2A, pressure drop of gas moving through filter material is added to pressure drop created by difference in levels of liquid inside and outside of rotating drum 2. It creates higher liquid velocity and better particle removal. While a reverse flow (backwash) system should provide better particle removal from the filter material for equipment with relatively small filter material gas pressure drop and with relatively big rotating drum diameter, for systems with high gas pressure drop on filter material and with relatively small rotating drum diameter, reverse flow is simply impossible.

In addition, because liquid is pumped through inlet nozzle inside the drum, it can be mixed with gas prior or after gas enters into the rotating drum. Depending on designer preferences and the type of application, liquid flow can be directed through a single or multiple nozzles, at different nozzle velocities, upward or downward, and so on. Nozzles could be located inside inlet duct and/or inside of the rotating drum. This arrangement might be especially useful for high temperature gases.

Figure 4A:
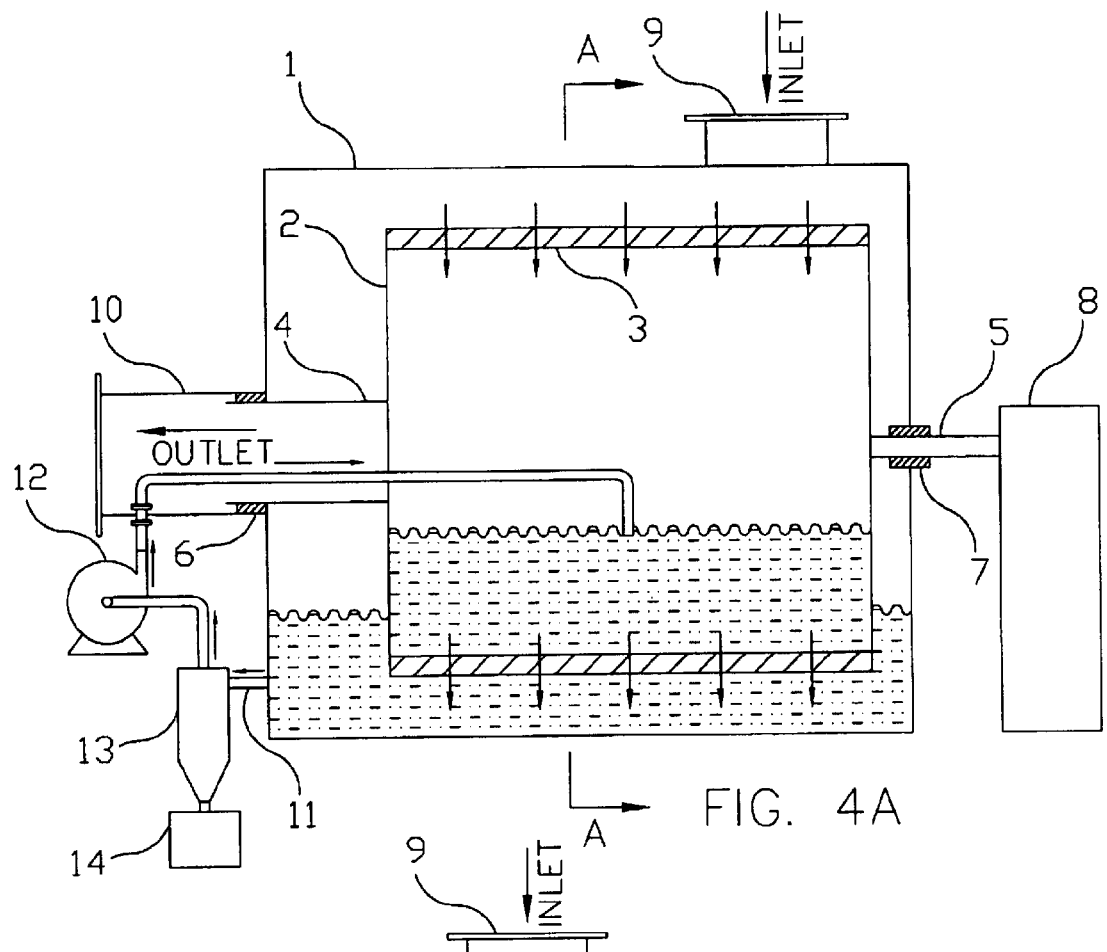
FIGS. 4A and 4B shows an arrangement similar to the arrangement shown on FIG. 2, except that flows of both gas and cleaning liquid are reversed.
Figure 4B:
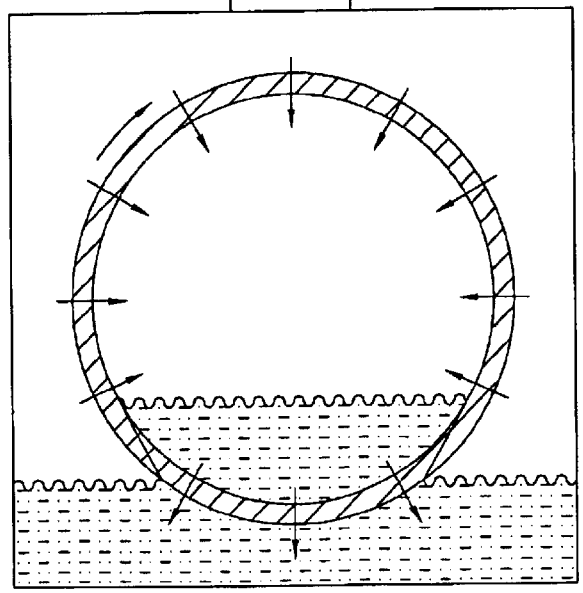

FIGS. 4A and 4B shows an arrangement similar to the arrangement shown on FIG. 2A, except that flows of both gas and cleaning liquid are reversed. Treated gas enters filter tank 1 through inlet 9, flows inside the drum through filtering material 3, and leaves rotating drum 2 through connecting duct 4 and outlet duct 10. Because dirty gas enters the rotating drum from outside, solid particles are attached to outer side of filtering material. It makes it easier to remove particles by spraying outer surface (similar to shown on FIG. 5A), by installing underwater ultrasound loudspeakers near rotating filtering material, or by any other method.

Cleaning liquid circulation system, except for flow direction, is similar to the one shown on FIG. 2A. Pump 12 pumps liquid from the filter tank 1 through a cyclone 13 (if cyclone is present) and into rotating drum 2. It results in liquid level in the rotating drum 2 to be much higher than in the filter tank 1. Reverse flow of liquid should effectively remove solid particles from the filtering material.

Figure 5A:
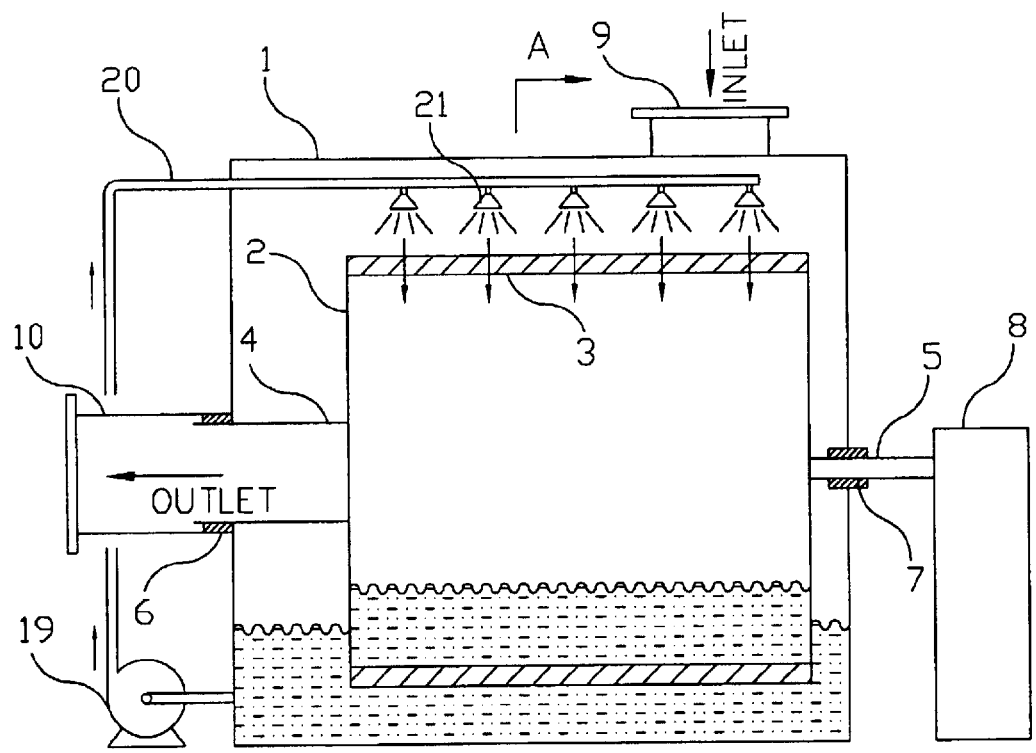
FIGS. 5A and 5B shows a circulation system for spraying of outer surface of filtering material.
Figure 5B:
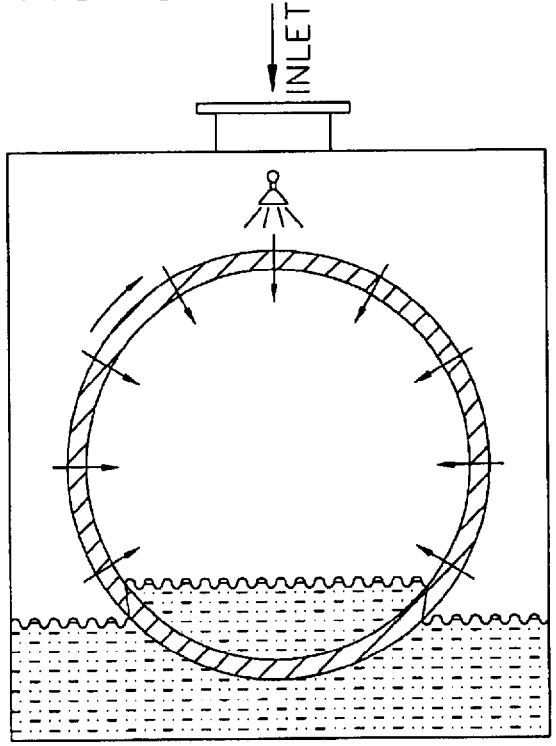

FIGS. 5A and 5B shows a circulation system for spraying of outer surface of filtering material. The circulation system consists of pump 19, piping 20, and spray nozzles 21. Spray nozzles, depending on application, can be installed anywhere, including gas inlet nozzle, and spray liquid in any direction. This circulation system can be used alone or in combination with reverse flow circulation system, shown on FIG. 4A. Instead of using a separate pump 19, spray nozzles can be connected to pump 12 (FIG. 4A), used for piping cleaning liquid into rotating drum 2.

Figure 6A:
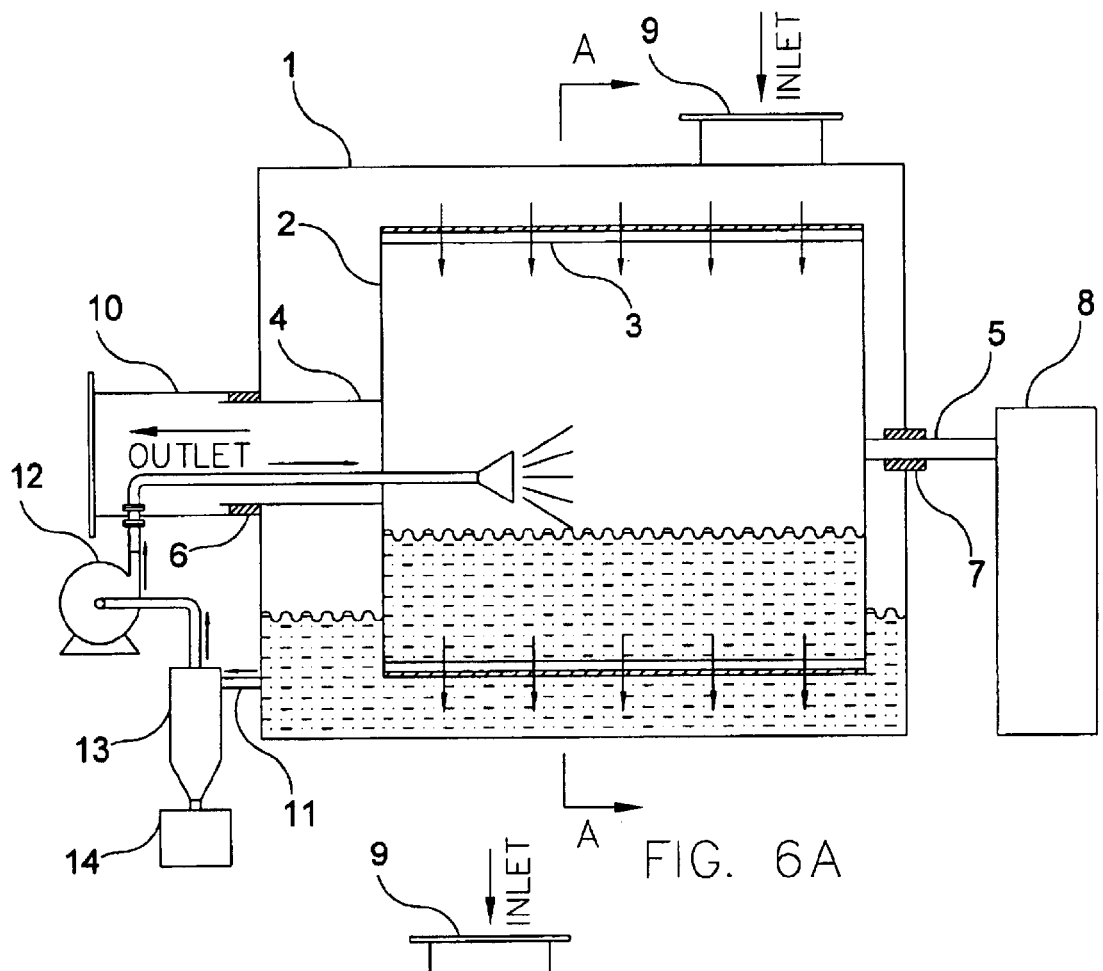
FIGS. 6A and 6B shows one of the possible configurations with non-cylindrical surface of filtering material.
Figure 6B:
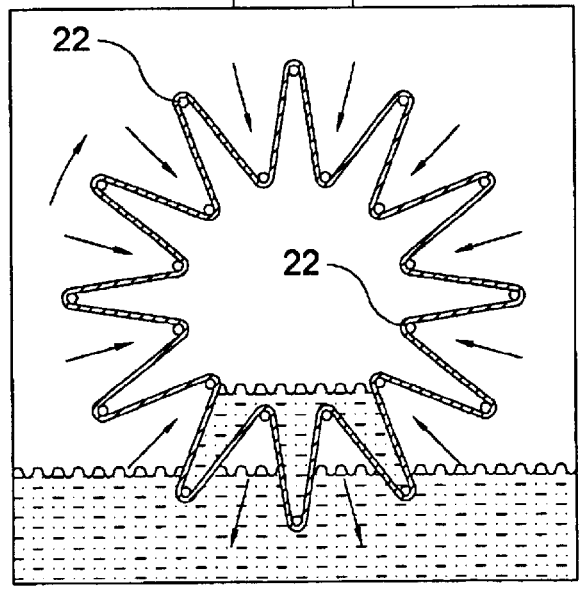

While cylindrical filtering material is the most appropriate for many applications, the capacity of scrubber can be increased without increasing outer dimensions. Capacity depends on the area of filtering material, and the area can be increased by using non-cylindrical shape of filtering material. There are many possible configurations. FIG. 6A and 6B shows one such configuration. Pipes or rods 22 are attached to side walls of rotating drum 2. It should be noted that a structure, which holds filtering material, might be of any form, but we will call it a drum for simplicity. Filtering material is located around the pipes or rods 22 in such a way as to create as big a surface as possible. Many other arrangements and supporting structures are possible.

The function of the cleaning liquid is not limited to cleaning solid particles from the filter material. If water is used as a cleaning liquid, it will absorb some gaseous pollutants. Some chemically active elements could be added to water or other cleaning liquid, such as limestone for absorption of Sulfur Oxides or a catalyzer. For some applications, a cleaning liquid can be chemically active as well.

The above description is only an example of a possible equipment arrangement. Many other arrangements are possible. Several drums could be located in the same filter tank. Water pumped from a drum located in one filter tank could be pumped into another filter tank. The same dust removal from liquid system could be used for several filter tanks.

Conclusions, Ramifications, and Scope of Invention

The invented Drum Scrubber provides a simple, inexpensive, energy-efficient way to remove pollutants from gases. This one step solution has additional advantages in that:

- It does not require a regular replacement of filtering material
- It has higher efficiency that a dry filter system
- It allows for efficient cleaning of material with very high dust loading.

While my above description contain many specificities, these should not be construed as limitations on the scope of the invention, but rather as an exemplification of one preferred embodiment thereof. Many other variations are possible. For example, filtering material could be made of catalytically active fibers, or fibers might be not used at all and be replaced by steel mesh.

Accordingly, the scope of the invention should be determined not by the embodiment(s) illustrated, but rather by the appended claims and their legal equivalent.

I claim:

1. An apparatus for removal of pollutants within treated gas, comprising:
    a vessel partially filled with liquid and having an inlet duct for receiving untreated gas and an outlet duct for removing treated gas,
    a rotating drum disposed within the vessel for receiving a flow of untreated gas,
    a surface of the drum made of filter material through which gas enters or exits the drum,
    means for rotating said drum, and
    a pipe reaching inside of the rotating drum for pumping liquid to or from the drum interior, wherein the pipe is attached to and extends through the inlet duct or outlet duct.

2. An apparatus according to claim 1 wherein liquid is pumped from inside of said rotating drum into said vessel.

3. An apparatus according to claim 2 wherein said liquid is cleaned before being pumped into said vessel.

4. An apparatus according to claim 1 wherein liquid is pumped from said vessel into said rotating drum.

5. An apparatus according to claim 4 wherein said liquid is cleaned before being pumped into said rotating drum.

6. An apparatus according to claim 1 wherein ultrasound is used to clean said filter material.

7. An apparatus according to claim 1 wherein said liquid is chemically active.

8. An apparatus according to claim 1 wherein said rotating drum is of any shape.

9. An apparatus according to claim 1 wherein filter material of said rotating drum is sprayed by liquid.

* * * * *